US005710557A

United States Patent [19]

Schuette

[11] Patent Number: 5,710,557

[45] Date of Patent: Jan. 20, 1998

[54] COMPUTERIZED VALET PARKING SYSTEM

[75] Inventor: Kai Herman Schuette, Detroit, Mich.

[73] Assignee: HTV, Inc., Southfield, Mich.

[21] Appl. No.: 687,210

[22] Filed: Jul. 25, 1996

[51] Int. Cl.[6] .......... B60Q 1/48

[52] U.S. Cl. .......... 340/932.2; 340/825.31; 340/825.34; 340/928; 235/380; 364/424.04

[58] Field of Search .......... 340/932.2, 928, 340/825.31, 825.34; 235/380; 364/467, 464.01, 423.098, 423.099, 424.039, 424.037, 424.04, 424.045

[56] References Cited

U.S. PATENT DOCUMENTS 5,339,000 8/1994 Bashan et al. .......... 340/932.2
5,373,282 12/1994 Carter .......... 340/539

*Primary Examiner*—Thomas Mullen
*Assistant Examiner*—Daryl C. Pope
*Attorney, Agent, or Firm*—Harness, Dickey & Pierce, P.L.C.

[57] ABSTRACT

A computerized valet parking system. The parking system includes a first data transceiver for inputting and retrieving a first set of vehicle identification data, and a second data transceiver located at a vehicle parking facility remote from the first data transceiver for inputting and retrieving a second set of vehicle identification data. A central processor includes a file memory for storing the first and second sets of vehicle identification data. The second data transceiver outputs vehicle pick-up data for vehicle identification and location purposes in response to a vehicle retrieval command from the central processor. The system of the present invention also includes remote vehicle retrieval and personalized valet service features.

40 Claims, 6 Drawing Sheets

| TICKET # | MAKE OF CAR | MODEL /TYPE | PLATE # | COLOR OF CAR | NAME (CRUST) | ZIP-CODE | TIME OF ARRIVAL | TOTAL LENGTH OF STAY | # OF 90-DAY VISITS | WHO PARKED IT? | SPOT # | WHAT TIME ? | TOTAL STAG-ING & PARK-ING TIME | TIME OF RETRIE-VAL RE-QUEST | WHO PULLED IT? | WHAT TIME ? | TOTAL RETRIE-VAL TIME | CHARGE /STATUS |
|---|---|---|---|---|---|---|---|---|---|---|---|---|---|---|---|---|---|---|
| 001 | VETTE | STS | 123 XYZ | WHITE | MRS SMITH | 48084 | 10:15A | 1:30 | 14 | JOHN F. | A-17 | 10:19A | 4:00 | 11:45A | SUE B. | 11:47A | 4:00 | 3.00 |
| TOTAL | | | | | | | | AVERAGE | AVERAGE | | | | AVERAGE | | | | AVERAGE | TOTAL |

86

Fig-6

| EMPLOYEE NAME | TIME-IN | TIME-OUT | TOTAL HOURS | TOTAL PARKED | TOTAL PULLED | AVERAGE PARKS PER HOUR | ALL TIME | AVERAGE PULLS PER HOUR | ALL TIME | RETRIEVAL TIME | ALL TIME | WRITE UPS |
|---|---|---|---|---|---|---|---|---|---|---|---|---|
| | | | | | | | | | | | | |
| | | | TOTAL | | | AVERAGE | AVERAGE | AVERAGE | AVERAGE | AVERAGE | AVERAGE | |

88

Fig-7

VALET PARKING
VEHICLE RETRIEVAL STATION
...PLEASE PLACE YOUR TICKET ON SCANNER
SURFACE TO REQUEST YOUR CAR...
↓ ↓ ↓

Fig-8

– MR. BROWN –
YOUR CAR HAS BEEN
REQUESTED. PLEASE LOOK
FOR IT IN THE VALET STAGING AREA.
CURRENTLY, WE HAVE APPROXIMATELY
A 4 MINUTE RETRIEVAL TIME.
THANK YOU FOR USING
OUR VALET SERVICE.

Fig-9

– MR. BROWN –
IT HAS BEEN 3 MINUTES SINCE
YOU FIRST REQUESTED YOUR CAR.
IT IS CURRENTLY EN ROUTE. PLEASE
LOOK FOR IT IN THE VALET
STAGING AREA. THANK YOU.

Fig-10

– MR. BROWN –
PLEASE SEE THE VALET
ATTENDANT FOR ASSISTANCE.
WE APOLOGIZE FOR THE WAIT.
THANK YOU.

Fig-11

COMPUTERIZED VALET PARKING SYSTEM

BACKGROUND OF THE INVENTION

1. Technical Discussion

The present invention relates generally to data storage and retrieval systems, and more particularly to a computerized valet parking system that includes accounting, employee performance evaluation, and statistical data report generation capabilities.

2. Discussion

Valet parking has long been popular at large facilities such as restaurants, hotels and nightclubs. Typically, a driver drops his or her car at a valet station. An attendant then writes the last name of the driver on a numbered, perforated ticket. The ticket is then torn in half, with the owner retaining a stub having the ticket number. The other half of the ticket, which includes the last name of the driver along with the ticket number, is attached to the car keys. An attendant then parks the car and stores the keys at a key station. When the driver is ready to leave the facility, he or she hands the numbered ticket to the attendant, who identifies the car keys on the key board by matching ticket stubs and returns the car to the driver.

While valet parking has historically been offered as an amenity only at facilities such as those mentioned above, recently valet parking has begun to be offered at more facilities, such as hospitals, shopping malls, and other high pedestrian volume locations. However, while valet parking has become more commonplace, the operational system utilized by most valet parking services has remained as described above.

Because facilities that offer valet parking typically contract the work out to a valet parking service, accounting control issues have increased in importance. In addition, it is important that the valet parking service is able to track which attendants handled particular vehicles, so as to reward honest, hardworking attendants, and to identify potentially problem attendants. In addition, it is desirable that the valet parking service be able to track vehicle retrieval times to insure that a valet customer is provided with quick, efficient retrieval of his or her vehicle.

Therefore, there is a need for a computerized valet parking system that is capable of offering a wide variety of functions to meet the demand placed on present-day valet parking services. For example, there is a need for a computerized valet system that provides accounting capabilities, as well as additional pertinent operational data such as peak times, space turnover and vehicle tracking, to the valet service. In addition, there is a need for a computerized valet parking system that provides the valet parking service with employee performance evaluation and accountability capabilities.

BRIEF DESCRIPTION OF THE DRAWINGS

FIG. 6 shows an operational table associated with the computer database of the valet parking system of the present invention;

FIG. 7 shows a sample electronic employee timesheet associated with the computer database of the valet parking system of the present invention;

FIGS. 8 through 11 illustrate successive screens appearing on a display at the vehicle retrieval kiosk shown in FIG. 1 upon a vehicle retrieval command being entered;

SUMMARY OF THE INVENTION

In response to the foregoing, the present invention provides a computerized valet parking system that provides system users with fast, efficient and professional valet service. The system of the present invention preferably provides a vehicle tracking system having accounting and operational data gathering functions. The computerized valet system of the present invention also also is capable of providing data on employee performance evaluation and employee accountability, thereby ensuring efficient operation of the valet parking service.

In particular, the present invention provides a valet parking system including a first data transceiver for inputting and retrieving a first set of vehicle identification data, and a second data transceiver located at a vehicle parking facility remote from the first data transceiver for inputting and retrieving a second set of vehicle identification data. A central processor includes a file memory for storing the first and second sets of vehicle identification data. The second data transceiver outputs vehicle pick-up data for retrieval purposes in response to a vehicle retrieval command from the central processor.

One of the features of the computerized valet parking system of the present invention includes initiating retrieval of a parked motor vehicle remotely from a vehicle staging area, thereby allowing a customer to remain within a building until his or her vehicle has been retrieved. An additional feature of the computerized valet parking system of the present invention includes personalizing the valet parking system by allowing a valet attendant to retrieve driver identification data upon entering vehicle license plate data, thereby permitting the attendant to greet the driver by name as the driver pulls his or her vehicle into a valet staging area.

DETAILED DESCRIPTION OF THE PREFERRED EMBODIMENT

Figure 1:
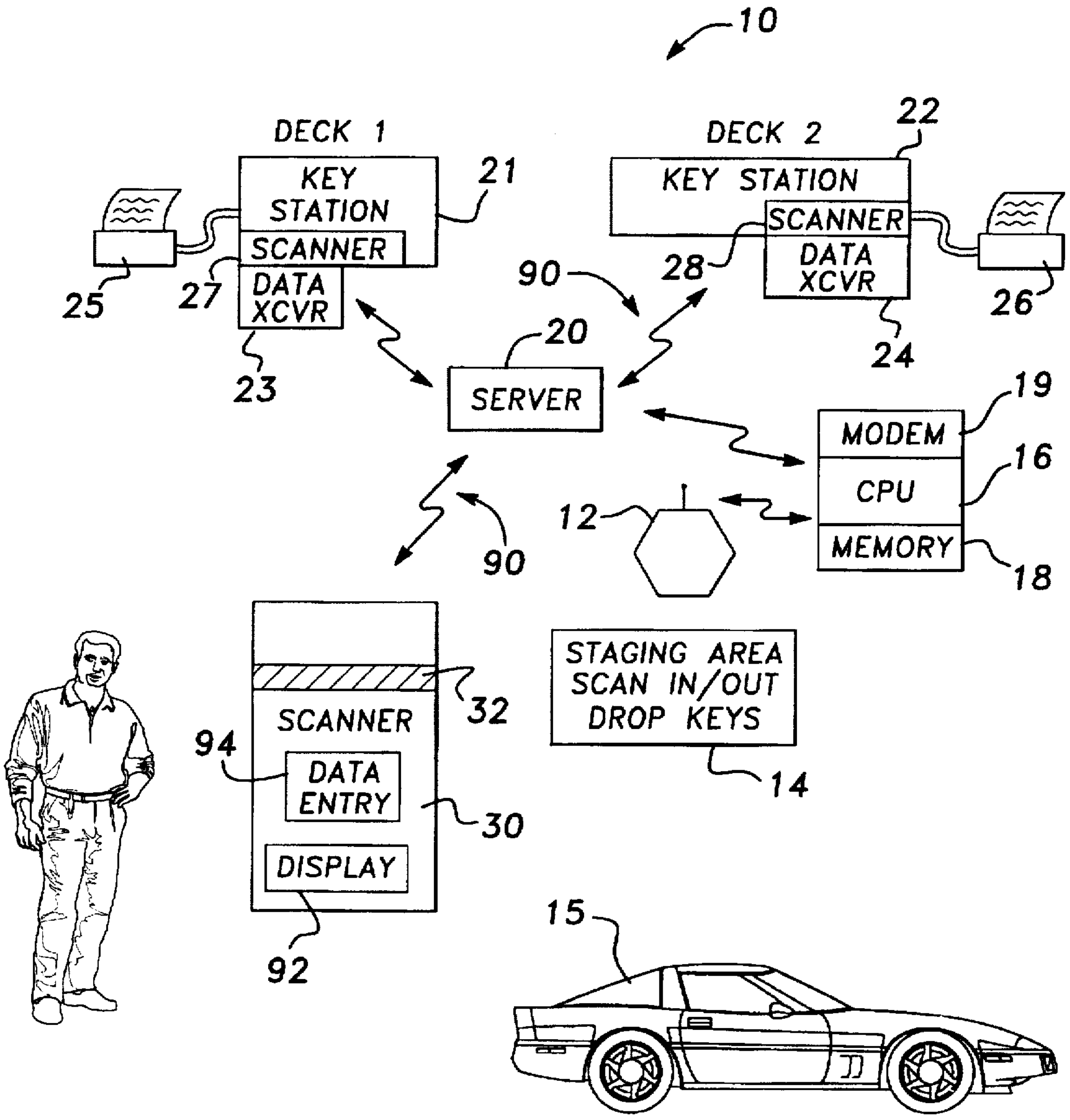
FIG. 1 illustrates a system block diagram of one embodiment of a computerized valet parking system made in accordance with the teachings of the present invention.
Figure 2:
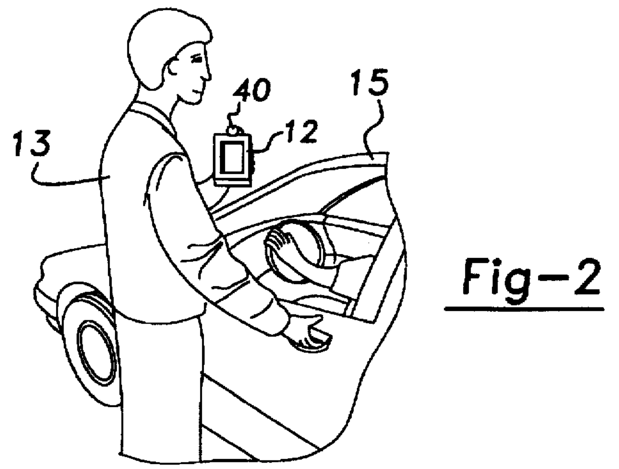
FIG. 2 illustrates a handheld data entry device implemented in the valet parking system of the present invention.
Figure 3:
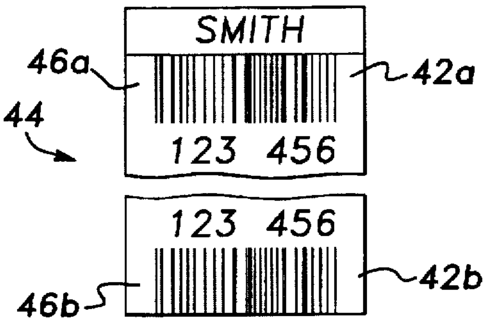
FIG. 3 illustrates a sample bar-coded ticket used with the computerized valet system of FIG. 1.

Referring now to the drawings, FIG. 1 shows a computerized valet parking system according to a preferred embodiment of the present invention generally at 10. The system 10 includes a portable handheld data input device 12 that permits a valet greeter 13 (FIG. 2) to input vehicle identification data, such as the last name of the vehicle driver, the vehicle license plate number, as well as other vehicle identification data discussed below, as a vehicle 15 is pulled into a vehicle staging area 14. The vehicle identification data is downloaded from the data input device into a CPU 16 having an associated memory 18 and computer modem 19. The CPU 16 is linked to a server 20 which interconnects the CPU 16 with remote key stations 21, 22, located in valet service parking lots (not shown). The remote key stations include data transceivers 23, 24 having associated data printout devices, such as printers 25, 26 and data input devices, such as scanners 27, 28. The server also connects the CPU with a vehicle retrieval kiosk 30, which includes a second data input device 32 permitting vehicle retrieval requests to be entered remotely from the valet staging area 14. Each of the system components identified above will be described in more detail below.

Referring to FIGS. 1 through 4, the data input device 12 is preferably a portable data input device such as the PPT 4600 Series Portable Pen Terminal with Integrated Scanner, manufactured by Symbol® Technologies of Bohemia, N.Y. The portable terminal is programmed to run in a DOS environment and includes a scanner 40 for scanning bar code data from a ticket, such as the perforated ticket shown at 42 in FIG. 3. The ticket 42 includes two identical bar code numerical sequences, as indicated at 46*a*, 46*b*. As described in more detail below, the scanner scans the ticket bar code sequence 46*a* for vehicle identification purposes. In addition, the data input device 12 includes a pen based input with both point and click and signature capture capability, as is well known in the art.

Figure 4:
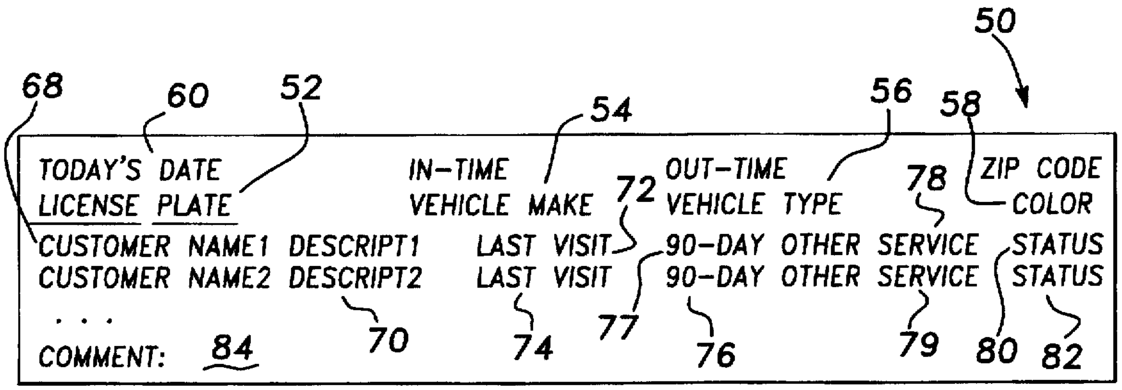
FIG. 4 illustrates a screen appearing on the handheld data entry device shown in FIG. 1.

As shown in FIG. 4, the data input device 12 is programmed to display a customer file screen, such as that shown at 50, on the data input device screen upon initiation of the system. First time customers will be asked for basic vehicle identification data, such as name, age, and requests for additional services, as time permits. Once the data is entered into the system, it is stored permanently at the CPU 16 and can be recalled by keying in data to any of the particular data fields shown on the screen 50. As mentioned above, the primary data entry prompt is preferably the vehicle license plate data prompt 52. Date and time-in data entry fields are automatically generated by the CPU 16. Vehicle make, vehicle type and vehicle color data is typically entered at data prompts 54, 56, 58 only the first time the particular car is parked via the valet parking system of the present invention. Customer Name No. 1 and Customer Name No. 2 data prompts 68, 70 enable the system to track up to four driver names associated with a particular vehicle with basic associated descriptions, preferably entered through a pop-up menu data entry field. Preferably, such pop-up menu data entry fields should include male/female and age range data.

In addition, the last visit data prompts 72, 74 indicate the date at which the car was last valeted. Further, ninety-day data prompts 76, 77 may be included to indicate the total number of valet visits in the last ninety days. Associated services data prompts 78, 79 are utilized to display additional services to be performed or that have been performed, such as such as car washes, oil changes, and other service-related items. Further, the screen includes status prompts 80, 82 for indicating if the customer is associated with a certain status, such as a VIP shopper, a frequent user of the system, a regular user of the system or other designated status indicators, for valet promotional or discount purposes. In addition, the screen includes a comment data prompt 84 for indicating additional information about the driver as desired by the specific valet parking service company. Preferably, the comment data prompt signals data entry preferably from a drop-down menu of choices to track past or present requested service-related items such as accidents, items reported missing out of the car, or long waits.

Figure 5:
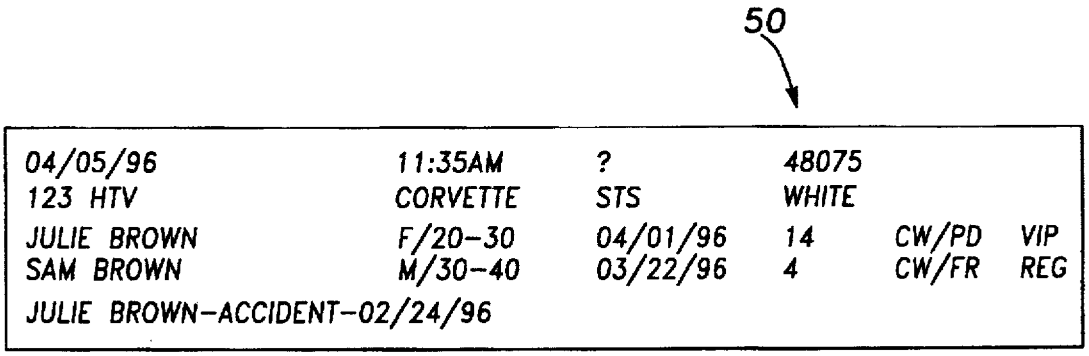
FIG. 5 shows the screen of FIG. 3 appearing with entered and retrieved data records.

It is contemplated that the computerized valet parking system of the present invention stores vehicle identification data such as that entered through the screen data prompts shown in FIG. 4. Thus, once the customer data has been entered into the system, only a single data entry need be entered, such as license plate data at data prompt 52, to trigger retrieval of the additional vehicle identification data from the processor 20 to the screen 50 as shown in FIG. 5. Such data retrieval minimizes the time necessary to enter vehicle identification data for repeat valet customers and thus accelerates the valet parking process.

In addition, the above-described data entry/data retrieval also allows the greeter to personalize the valet parking process by personally greeting a customer whose data has been previously input into the system, as the system, upon entry of vehicle license plate data, automatically retrieves customer names and other vehicle and customer data. In addition, such data retrieval also indicates particular services that have historically been requested by the customer, thereby allowing the greeter to target the particular service needs of the customer as the customer pulls his or her vehicle into the vehicle staging area 14.

It should be appreciated that the greeter may enter data into the data input device through conventional keyboard entry. However, it should also be appreciated that the data may also be entered through touch-pen methods, pop-up menu methods, or any other conventional data entry methods associated with data entry devices utilized with the service.

Referring again to FIG. 1, the CPU 16 is preferably a conventional personal computer having a processor, such as the Intel Pentium® processor. The CPU memory 18 includes computer random access memory (RAM), read only memory (ROM), or any other conventional computer memory, for storing vehicle identification data, customer identification data, and vehicle location data. The CPU 16 is preferably configured to run in the DOS environment, using Foxpro 2.6 software programming language, and permits multiple data input devices and scanners to be utilized with the valet parking system of the present invention. System defaults are also stored at the CPU. The system defaults include fax numbers for faxing overnight reports generated by the CPU, as discussed below. In addition, technical support telephone numbers and contacts may also be entered and stored at the CPU 16, with such numbers being accessible only through entry of a password into the CPU 16. Additional files may also be created and maintained at the CPU 16, as desired by the valet parking service, in a manner well known to those skilled in the software programming art.

It should be appreciated that if time is critical during data entry for a particular vehicle, the system will function with only the license plate data being entered into the system. Additional data can then be entered during subsequent customer visits. It should be appreciated that gathered data such as zip codes, male/female status, and/or time of day usage may be utilized to initiate customer incentives or coupons in promotional mailers.

Referring again to FIG. 1, the CPU 16 is programmed to track daily system operations through numerous data entries. As shown in FIG. 6, a table 86 summarizes the operational system. As shown in FIG. 7, a table 88 illustrates a sample electronic timesheet with employee performance specifications. Data is entered into the CPU after the associated screen prompts at one of the system data input stations described below. When the data is accumulated, valet service management may choose which data fields are to be displayed in report format and generate reports accordingly on a daily, weekly or other periodic basis. The processor is programmed to electronically fax, via the computer modem 19 and an outside data line (not shown), the generated reports to designated remote sites at the end of each day, thereby updating valet system subscribers such as mall or restaurant management, of the daily operations.

Referring again to FIG. 1, the key stations 21, 22 are typically located remotely from the staging area 14, for example, in vehicle parking decks or parking lots. Referring to the key station 21, with the understanding that the key station 22 is identical in nature, the station scanner 27 is preferably a Metrologic MS 860 Encounter unidirectional scanner and associated power supply. The data transceiver 23, which is preferably a conventional personal computer, is linked to the CPU 16 via the server 20. Once an attendant has parked a vehicle, he or she scans the bar code on the ticket stub **42*b* associated with the car keys through the scanner 27. Subsequently, attendant identification data, parking spot number data, and total staging and parking time data is entered into the data transceiver 23** as indicated in Table 1 through use of a data entry method such as those described above. Therefore, attendant performance and accountability may be tracked for both performance evaluation and liability purposes.

The printer 25 is utilized to print vehicle retrieval data in response to a vehicle retrieval command sent to the data transceiver 23 by the CPU 16, as will be described in more detail below. The printer 25 facilitates vehicle location and retrieval by the attendant, thereby minimizing customer vehicle retrieval time.

Still referring to FIG. 1, the server 20 is preferably a Hewlett-Packard NetServer Model LC5/100 and includes a 100 mHz Intel Pentium® central processing unit and 32 MB of RAM, a 256 Kb cache, and a 1 GB hard drive. The server preferably operates on a Novel Netware Version 3.12 and includes a 3Com 3C590-TPO pci 32 bit Etherlink III network card. The server 20 thereby facilitates communication between the system components through a communication link, indicated generally at 90. This communication link may be implemented through a fiber-optic network link, a wireless RF network link, a cabled network link, or any other well known network link.

Referring again to FIG. 1, the vehicle retrieval kiosk 30 is preferably located within the facility at which the valet system of the present invention is implemented and provides the valet customer with a remote, interior site for requesting retrieval of his or her vehicle. Preferably, the kiosk includes a data input device, such as the scanner 32, through which the vehicle owner swipes the retained bar-coded ticket stub **42*a*. Alternately, the kiosk can include a display 92 and keyboard 94, for manual entry of vehicle identification data. Once the data is entered at the kiosk 30, it is transmitted to the CPU 16 through the server 20, and then on to the appropriate key station. The retrieval command also triggers the CPU 16** to generate a report at the appropriate printer thereby triggering retrieval of the particular vehicle by a parking attendant.

Referring to FIGS. 8 through 11, a sequence of screens appears on the kiosk display 92 subsequent to the retrieval command being entered at the kiosk, or alternatively at the data input device 12. As shown in FIG. 8, the display initially requests placement of the ticket stub **42*a* on the scanner by the valet customer. As shown in FIG. 9, after the bar code on the ticket stub 42*b* has been scanned, the display 92** indicates to the valet customer that the vehicle has been requested, and that the customer should wait for the vehicle at the valet staging area.

The display 92 also displays to the customer the approximate retrieval time. The approximate retrieval time is computed at the CPU through a conventional software programming technique. The technique generates a sliding window that computes average vehicle retrieval time over a predetermined time period, which may be programmed to range from a few minutes to several hours. The predetermined time period thus varies over the course of a day to account for both high volume and low volume periods. The sliding window thus updates average vehicle retrieval time to ensure that, for instance, if the predetermined time period is set at 1 hour, the vehicle retrieval time appearing on the display 92 reflects the 1 hour prior to the current customer vehicle retrieval request.

As shown in FIG. 10, if the vehicle owner again scans the ticket stub **42*b*, the display 92 indicates that the vehicle is en route, and that the customer should wait at the staging area. Alternatively, the customer may wait in the building or in proximity to the kiosk until the estimated retrieval time has elapsed. As shown in FIG. 11, if time elapsed since the vehicle request has passed a reasonable multiple factor of a current average retrieval time factor, such as 1.5 times the current average retrieval time, the display indicates to the customer that he or she should see the valet attendant. Therefore, during normal system operation, valet customers may wait inside the building and may request the vehicle remotely from the valet attendant. However, it should be appreciated that the car owner may also request vehicle retrieval personally from the attendant, and the attendant may scan the car retrieval data from the ticket stub 42*b*** or may manually enter a car retrieval command as desired.

At this point it should be appreciated that a customer may drop off his or her vehicle at one site and retrieve it from another site. It should also be appreciated that the customer has the choice of using automatic retrieval or valet attendant retrieval, thereby increasing customer service and control.

It should also be appreciated that valet attendants and other valet service employees will be required to sign-on to the CPU 16 with an employee badge through any one of the data input devices. Thus, tardy employees will be immediately identified. A bi-weekly timesheet may be used by the service payroll department for paycheck generation purposes. In addition, the computerized valet parking system of the present invention will minimize the occurrence of lost keys and liability associated with conventional handwritten ticket valet systems, as data entered into the system 10 in accordance with established system procedures may be accurately tracked.

Figure 12:
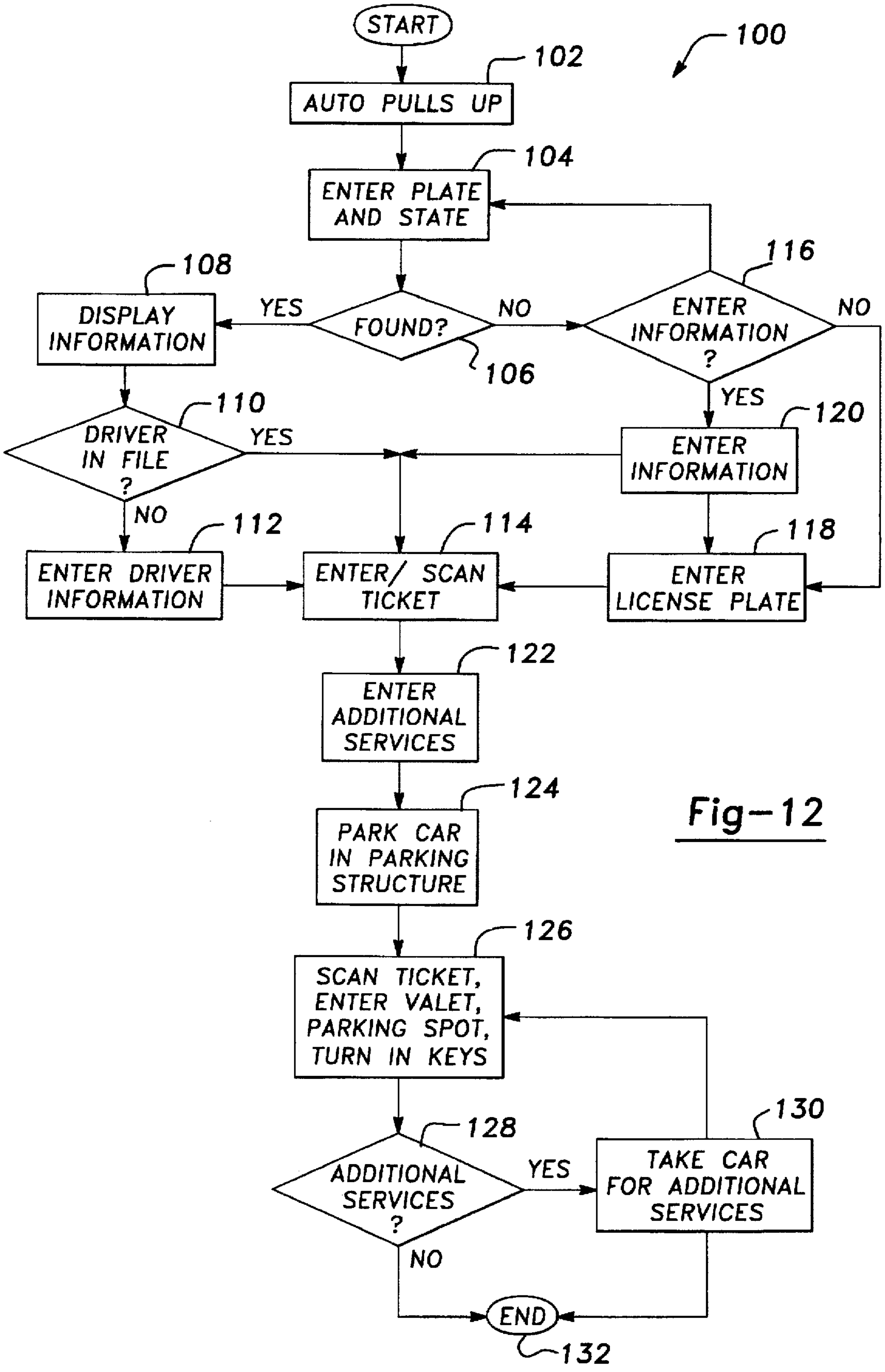
FIG. 12 illustrates a flow diagram showing the methodology implemented for parking a vehicle in association with the computerized valet parking system of the present invention.

Referring now to FIG. 12, the methodology of the computerized valet parking system of the present invention will now be described in association with parking a vehicle, as shown generally at 100. At step 102, a vehicle enters the valet staging area. At step 104, a valet attendant enters vehicle license plate data. Subsequently, at step 106, if the customer is a repeat customer, additional stored customer data, such as the name of the customer and comments previously entered at data prompt 84 about the customer, is retrieved from the CPU to the data input device as indicated at step 108 to permit the greeter to personalize the valet parking process. At step 110, by viewing the customer data display, the parking attendant determines if the particular vehicle driver is in the file. At step 112, if vehicle data is in the system, but not the particular driver, the attendant enters driver data, such as name, sex and age data. If it is determined that the driver is already in the file, the methodology advances to step 114 and the bar code ticket stub **42*a* is scanned by the data input device 12**.

Returning to step 106, if the attendant enters the vehicle license plate data and additional vehicle data is not found in the CPU 16, it is determined that the customer is a first-time customer. Subsequently, the parking attendant enters additional vehicle and customer identification data at step 116 as time permits. Alternatively, the parking attendant may again try to enter license plate data at step 104. If time is critical at step 116, the parking attendant may enter only license plate data, as indicated at step 118, and advance directly to step 114 to scan the bar code on the ticket stub 42*a*. However, if the parking attendant does have time, additional driver and vehicle identification data is entered at step 120 before, or after, the ticket stub is scanned at step 114.

After the bar code data is scanned by the data input device 12, the parking attendant may enter additional requested customer services at step 122. These services are then flagged at the key station where the vehicle is to be parked. At step 124, the vehicle is parked. Subsequent to parking the vehicle, the parking attendant again scans the ticket stub 42*b* at the scanner 27 and enters valet attendant identification data and parking spot data through the data transceiver 23 before storing the keys at the key station 22, as indicated at step 126. At step 128, if additional services have been requested by the customer, the parking attendant addresses the requests at step 130. If no additional services are requested, the method ends at step 132.

Figure 13:
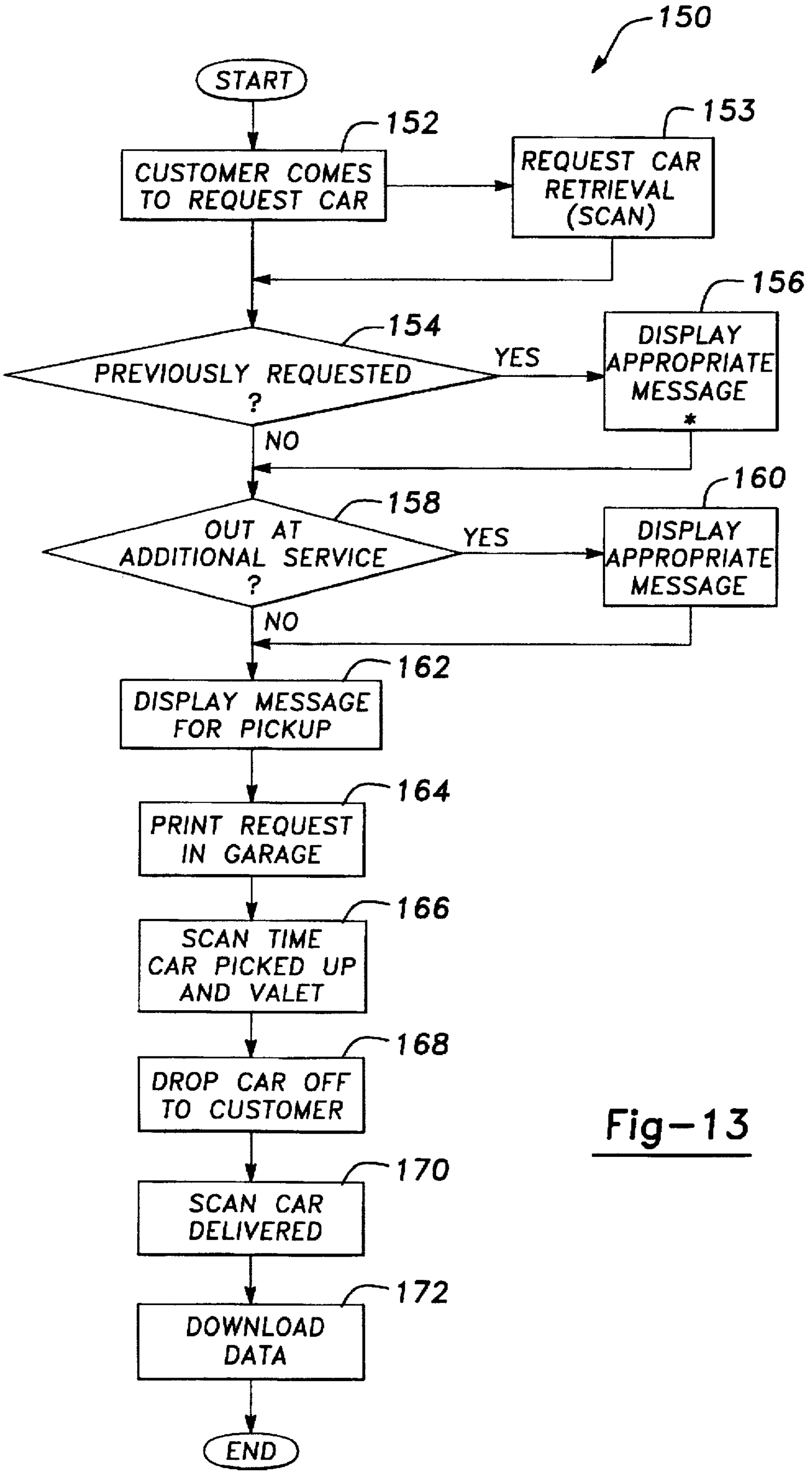
FIG. 13 is a flow diagram illustrating the methodology implemented for retrieving a parked vehicle using the computerized valet parking system of the present invention.

Referring now to FIG. 13, preferred methodology of the computerized valet parking system of the present invention will now be described in association with vehicle retrieval, as indicated generally at 150. At step 152, the customer requests retrieval of his or her vehicle. As described above, a customer may request the vehicle either remotely from the vehicle retrieval kiosk 30 or directly from the valet staging area 14 through an associated scanner, as indicated at 153, as desired. At step 154, the methodology determines if the customer has made a previous car retrieval request. If so, at step 156, either the data input device 12 or the display 92 displays an appropriate message, indicating that the vehicle retrieval request has already been made. At step 158, if the vehicle is having additional services performed at the time of the retrieval request, either the data input device 12 or the display 92 displays the appropriate message, as indicated at 160. At step 162, a pick-up message is generated at the data transceiver 23. Subsequently at step 164, a vehicle retrieval request is printed at the printer 25. At step 166, once the vehicle is retrieved, the attendant scans the time of the vehicle pick-up and enters valet identification data. At step 168, the attendant returns the vehicle to the customer at the vehicle staging area or at another designated pick-up site. At step 170, the attendant scans in the time that the vehicle was returned to the customer. At step 172, all of the data associated with a particular vehicle retrieval is then downloaded to the CPU and stored for subsequent transactions and for report generation purposes, and the method ends.

It should be appreciated that the valet parking system 10 described above facilitates quick and accurate parking and retrieval of motor vehicles not presently obtainable with conventional valet services. The valet system 10 provides electronic accounting functions and generates additional operational data, such as peak times data, space turnover data, and pinpoint vehicle tracking data also not presently available with traditional valet parking services. In addition, the computerized valet parking system 10 enables the system operator to track individual employee performance, and associates each parked vehicle with a particular employee, both during parking and retrieval operations. The computerized valet parking system of the present invention also allows a vehicle owner to retrieve his or her vehicle in a location remote from vehicle drop-off points and updates the owner as to the retrieval status, thereby insuring an efficient vehicle retrieval procedure. Therefore, the computerized valet parking system of the present invention is desirable for large, high volume parking service operations such as shopping malls and hotels, as it facilitates parking of a maximum number of vehicles with a minimum number of individuals being involved.

While the above detailed description describes the preferred embodiment of the present invention, the invention is susceptible to modification, variation and alteration without deviating from the scope and fair meaning of the subjoined claims.

What is claimed is:

1. A valet parking system, comprising:

a ticket associated with a vehicle being parked having unique electronically readable indicia;

a data transceiver for inputting and retrieving a first set of vehicle identification data including said electronically readable indicia from said ticket;

a vehicle parking lot key station located at a vehicle parking facility remote from said data transceiver for inputting and retrieving a second set of vehicle identification data;

a central processor including a file memory for storing said first and second sets of vehicle identification data; and said vehicle parking lot key station outputting vehicle pick-up data for retrieval purposes in response to a vehicle retrieval command from said central processor.

2. The system of claim 1, further comprising a vehicle return station located remotely from said data transceiver and said parking lot key station and operatively connected to said central processor for initiating said vehicle retrieval command at said central processor.

3. The system of claim 1, further comprising a server interconnecting said data transceiver, said parking lot key station, and said central processor via a communication link.

4. The system of claim 3, wherein said communication link comprises a wireless communication link.

5. The system of claim 1, further comprising output means coupled to said parking lot key station for providing said second set of vehicle identification data to an attendant for vehicle identification and location purposes.

6. The system of claim 5, wherein said output means comprises a printer.

7. The system of claim 1, wherein said data transceiver is a wireless handheld data transceiver including a scanner.

8. The system of claim 7, wherein said electronically readable indicia comprises bar code data read by said scanner.

9. The system of claim 1, wherein said first set of vehicle identification data comprises vehicle license plate data.

10. The system of claim 9, wherein said first set of vehicle identification data further comprises driver identification data.

11. The system of claim 1, wherein said second set of vehicle identification data comprises parking spot location data.

12. A method of systematically parking and retrieving a motor vehicle, comprising:

receiving a vehicle to be parked;

associating a ticket having electronically readable indicia with said vehicle;

entering vehicle identification data and the electronically readable indicia into a central database;

parking said vehicle;

entering vehicle location data into the central database at a vehicle parking lot key station subsequent to said step of parking said vehicle;

receiving a vehicle retrieve command;

outputting vehicle retrieval data from said vehicle identification and location data previously entered into the central database at a vehicle parking lot key station in response to said step of receiving said vehicle retrieve command; and retrieving said vehicle in response to said step of outputting said vehicle retrieval data.

13. The method of claim 12, wherein said step of entering vehicle identification data comprises scanning bar code data from the ticket associated with said vehicle into the central database.

14. The method of claim 13, wherein said step of entering vehicle location data comprises re-entering said bar code data into the central database subsequent to said step of parking said vehicle.

15. The method of claim 12, further comprising the step of scanning in vehicle identification data to initiate said step of receiving a vehicle retrieve command.

16. The method of claim 15, wherein said step of scanning in vehicle identification data comprises the step of scanning in vehicle identification data remotely from said step of entering vehicle identification data.

17. The method of claim 12, wherein said step of outputting vehicle retrieval data at a vehicle parking lot key station comprises printing said vehicle retrieval data at a key station in proximity to said parked vehicle.

18. The method of claim 12, wherein said step of entering vehicle location data comprises re-entering bar code data, entering valet attendant identification data, and entering parking space identification data.

19. The method of claim 12, wherein said step of receiving a vehicle retrieve command comprises the step of receiving a vehicle retrieve command in response to the electronically readable indicia being re-entered into the central database.

20. A valet parking system, comprising:

a handheld data transceiver for inputting a first set of vehicle identification data from a vehicle being parked;

a second data transceiver located at a vehicle parking facility remote from said first data transceiver for inputting a second set of vehicle identification data from the vehicle after the vehicle is parked;

a central processor including a file memory for storing said first and second sets of vehicle identification data;

remote retrieval means operative for permitting vehicle retrieval from a site remote from said handheld data transceiver;

a server operatively linking said handheld data transceiver, said second data transceiver, said central processor and said remote retrieval means;

said second data transceiver including a printer for printing vehicle pick-up data for retrieval purposes in response to a vehicle retrieval command being generated by either said handheld data transceiver or said remote retrieval means and sent from said central processor; and means for generating financial and employee performance evaluation reports based on a third set of data derived from said first and second sets of vehicle identification data.

21. In a valet parking system including a vehicle retrieval request station located remotely from a valet parking system staging area, a method of initiating retrieval of a parked motor vehicle, comprising the steps of:

receiving a vehicle retrieval request at the vehicle retrieval request station;

computing a vehicle retrieval time window to determine average vehicle retrieval time for a predetermined time period; and displaying an expected vehicle retrieval time based on the vehicle retrieval time window at the vehicle retrieval request station.

22. The method of claim 21, wherein said step of computing a vehicle retrieval time window comprises computing a sliding time window that compiles an average of vehicle retrieval times over the predetermined time period.

23. The method of claim 22, further comprising the step of periodically updating the sliding time window to maintain accuracy of said step of displaying an expected vehicle retrieval time.

24. In a valet parking system including at least one data transceiver in communication with a central database, a method of implementing a personalized valet parking system, comprising the steps of:

receiving a vehicle to be parked for a first time through said valet parking system;

entering vehicle license plate data as a first data set;

entering customer name data as a second data set;

storing said first and second data sets;

upon a subsequent return of said vehicle to said valet parking system, entering said vehicle license plate data;

automatically retrieving said second data set in response to said step of entering said vehicle license plate data, thereby permitting a valet parking system attendant to identify and greet a driver of said vehicle by name.

25. The method of claim 24, further comprising the step of entering additional vehicle identification data and driver identification data as a third data set, and automatically retrieving said third data set in response to said step of entering said vehicle license plate data.

26. A computerized valet parking system, comprising:

a ticket associated with a vehicle being parked that has a set of unique electronically readable indicia;

a data transceiver for inputting a first set of vehicle identification data including said electronically readable indicia;

a central processor including a file memory for storing said first set of vehicle identification data;

a vehicle retrieval device located at a site remote from said data transceiver to allow said vehicle to be retrieved from one of a plurality of vehicle retrieval sites based on a received vehicle retrieval command associated with said electronically readable indicia; and a server that operatively links said data transceiver, said central processor and said vehicle retrieval device.

27. The system of claim 26, wherein said data transceiver comprises a handheld data transceiver located at a vehicle staging area and coupled to said system by said server through a wireless communication link.

28. The system of claim 27, further comprising means for generating reports based on system operation over a predetermined time period.

29. The system of claim 28, further comprising means for downloading said reports to a remote database on a periodic basis.

30. The system of claim 28, wherein said reports comprise system accounting reports.

31. The system of claim 28, wherein said reports comprise employee evaluation reports.

32. A method for valet parking of vehicles, comprising:

(a) providing a ticket to a customer for a vehicle presented by the customer to a parking attendant for parking, said ticket having electronically readable indicia thereon;

storing the electronically readable indicia together with vehicle identification information into a computer memory;

(c) parking the vehicle at a parking location;

(d) storing parking location information into the computer memory;

(e) receiving a vehicle retrieval request generated in response to the electronically readable indicia on the ticket being read; and (f) thereafter, prior to retrieving the vehicle for the customer, fetching the stored vehicle identification information and the parking location information associated with the electronically readable indicia from the computer memory.

33. The method of claim 32, further comprising the steps of:

(g) providing visually observable data identifying the vehicle and the vehicle parking location based on step (f);

(h) retrieving the vehicle from its parked location; and (i) presenting the vehicle to the customer.

34. The method of claim 32, wherein step (b) further comprises:

additionally storing the name of the customer, along with customer identifying information, into the computer memory; and thereafter, determining whether the vehicle identification information has previously been entered into the computer memory and, if so, providing visually observable data indicating the name of the customer associated with the vehicle identification information so that the parking attendant can greet an old customer by name.

35. The method of claim 33, further comprising the steps of:

additionally storing in step (b) parking rate information into the computer memory regarding an applicable customer service charge; and additionally providing a visually observable indication in step (g) about the customer service charge when the vehicle is retrieved.

36. The method of claim 32, further comprising the steps of:

(g) additionally storing in step (d) employee identification data for identifying a parking attendant who parked the vehicle;

(h) entering the employee identification data into the computer memory identifying the parking attendant who retrieved the vehicle; and (i) generating a management report associated with the data entered in steps (g) and (h).

37. The method of claim 36, wherein the management report includes data based on at least one of the following categories:

(a) parking attendant identification information relating to who parked or retrieved a given vehicle;

(b) the number of vehicles parked and retrieved by a given parking attendant;

(c) duration of time worked by a given parking attendant;

(d) total staging and parking time associated with a particular vehicle and parking attendant; and (e) total retrieval time associated with a particular vehicle and parking attendant.

38. The method of claim 32, further comprising the steps of:

using a handheld transceiver to read the indicia, enter given information associated with the indicia, and wirelessly transmit the indicia and information to the computer memory.

39. The method of claim 32, further comprising the step of:

transmitting data to a remote transceiver located in an area adjacent to the parked vehicle; and using the transmitted data to provide the visually observable data in step (f).

40. The method of claim 32, further comprising the steps of:

providing a remote retrieval station at which the customer may present the ticket;

reading the indicia on the ticket at the remote retrieval station; and initiating steps (e) and (f) whereby a customer can initiate retrieval of the vehicle at a location remote from the location where the vehicle is ultimately presented to the customer by the parking attendant.

* * * * *

US005710557C1

(12) EX PARTE REEXAMINATION CERTIFICATE (8295th)

United States Patent

Schuette

(10) Number: US 5,710,557 C1

(45) Certificate Issued: Jun. 7, 2011

(54) COMPUTERIZED VALET PARKING SYSTEM

(75) Inventor: Kai Herman Schuette, Detroit, MI (US)

(73) Assignee: CVPS, Inc., Detroit, MI (US)

Reexamination Request:
No. 90/010,625, Nov. 13, 2009

Reexamination Certificate for:

| | |
|---|---|
| Patent No.: | **5,710,557** |
| Issued: | **Jan. 20, 1998** |
| Appl. No.: | **08/687,210** |
| Filed: | **Jul. 25, 1996** |

(51) Int. Cl.
*G07B 15/02* (2006.01)
*G01M 17/00* (2006.01)

(52) U.S. Cl. .................... 340/932.2; 340/5.61; 340/928; 235/380; 701/35

(58) Field of Classification Search ........................ None
See application file for complete search history.

(56) References Cited

U.S. PATENT DOCUMENTS

| | | | |
|---|---|---|---|
| 2,594,388 | A | 4/1952 | Broussard |
| 4,592,157 | A | 6/1986 | Kerr |
| 4,603,390 | A | 7/1986 | Mehdipour et al. |
| 4,720,785 | A | 1/1988 | Shapiro |
| 4,962,955 | A | 10/1990 | Ferrara et al. |
| 4,990,757 | A | 2/1991 | Edwards et al. |
| 5,550,551 | A | 8/1996 | Alesio |
| 5,669,753 | A | 9/1997 | Schween |

OTHER PUBLICATIONS

Article from "Parking Today", vol. 1, No. 2, pp. 12–14, Jun. 1996.

*Primary Examiner*—Sam Rimell

(57) ABSTRACT

A computerized valet parking system. The parking system includes a first data transceiver for inputting and retrieving a first set of vehicle identification data, and a second data transceiver located at a vehicle parking facility remote from the first data transceiver for inputting and retrieving a second set of vehicle identification data. A central processor includes a file memory for storing the first and second sets of vehicle identification data. The second data transceiver outputs vehicle pick-up data for vehicle identification and location purposes in response to a vehicle retrieval command from the central processor. The system of the present invention also includes remote vehicle retrieval and personalized valet service features.

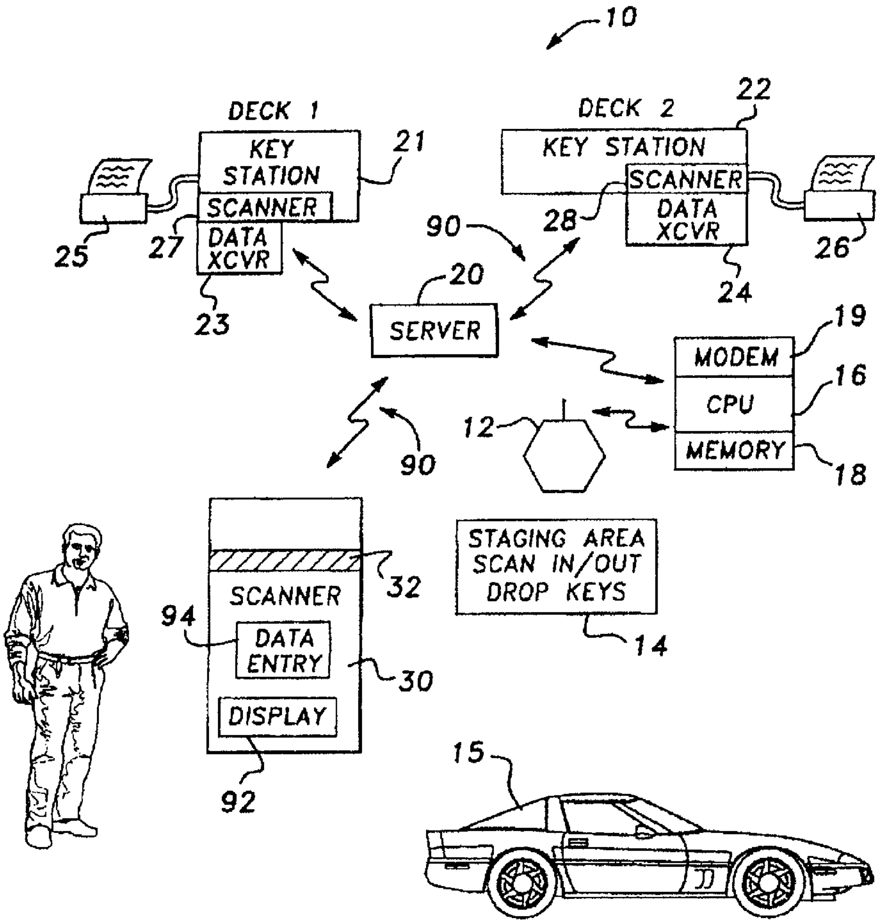

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-4, 20-31 and 34 is confirmed.

Claims 1, 5-19, 32-33 and 35-40 are cancelled.

* * * * *